United States Patent [19]
Mehrotra et al.

[11] Patent Number: 6,115,717

[45] Date of Patent: *Sep. 5, 2000

[54] SYSTEM AND METHOD FOR OPEN SPACE METADATA-BASED STORAGE AND RETRIEVAL OF IMAGES IN AN IMAGE DATABASE

[75] Inventors: Rajiv Mehrotra, Rochester; James Warnick, Pittsford; Donna M. Romer, Rochester, all of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,481

[22] Filed: Jun. 30, 1997

Related U.S. Application Data

[63] Continuation of application No. 08/786,932, Jan. 23, 1997, Pat. No. 5,901,245.

[51] Int. Cl.$^7$ .................................................. G06F 17/30

[52] U.S. Cl. .................... 707/102; 707/104; 345/503; 382/190

[58] Field of Search .................................. 707/102, 104; 345/503; 340/825.22; 382/190; 396/56; 280/834

[56] References Cited

U.S. PATENT DOCUMENTS

| | | | |
|---|---|---|---|
| 5,493,677 | 2/1996 | Balogh | 707/104 |
| 5,696,892 | 12/1997 | Redmann | 395/125 |
| 5,838,334 | 11/1998 | Dye | 345/503 |
| 5,901,245 | 5/1999 | Warnick | 392/190 |

OTHER PUBLICATIONS

Color Designations for Lights by Kenneth Kelly, Journal of the Optical Society of America, vol. 33, No. 11, Nov. 1943, pp. 627–632.

Locating Basic Colors in the OSA Space by Robert M. Boynton and Conrad X. Olson, Color Research and Application, vol. 12, 1987, pp. 94–105.

Xlib Programming Manual for Version 11 of the X Window System, by Adrian Nye, vol. one, 1990, pp. 187–188.

FlashPix Format Specification, Version 1.0, Sep. 11, 1996.

R–Trees: A Dynamic Index Structure for Spatial Searching by Antonin Guttman, Proc. ACM Sigmod Int. Conf. on Management of Data, 1984, pp. 47–57.

R–Tree: An Efficient and Robust Access Method for Points and Rectangles by Norbert Beckmann, Hans–Peter Kriegal, Ralf Schneider, Bernhard Seeger, Proc. ACM Sigmod Int. Conf. on Management of Data, 1990, pp. 322–331.

The K–D–B Tree: A Search Structure for Large Multidimensional Dynamic Indexes, by John T. Robinson, Proc. ACM Sigmod Int. Conf. on Management of Data, 1981, pp. 10–18.

Algorithms for BD Trees by Sivarama Dandamudi and Paul Sorenson, Software–Practice and Experience, vol. 16(12), Dec. 1986, pp. 1077–1096.

G–Tree: A New Data Structure for Organizing Multidimensional Data by Akhil Kumar, IEEE Transactions on Knowledge and Data Engineering, vol. 6, No. 2, Apr. 1994, pp. 341–347.

The Grid File: An Adaptable, Symmetric Multikey File Structure by J. Nievergelt, H. Hinterberger and K. Sevcik, ACM Trans. Database Systems, vol. 9(1), 1984 pp. 38–71.

The Ubiquitous B–Tree by Douglas Comer, Computing Surveys, vol. 11, No. 2, Jun. 1979, pp. 121–137.

*Primary Examiner*—Thomas G. Black
*Assistant Examiner*—Diane D. Mizrahi
*Attorney, Agent, or Firm*—David M. Woods

[57] ABSTRACT

A system for the storage of a digital image in an image database, the system comprises: a processor; software for automatically generating with said processor open space metadata from the digital image independent of manually inputting data; and software for storing the open space metadata along with the associated image in the image database.

73 Claims, 9 Drawing Sheets

| IMAGE-ID | OS-MAP-ID | V1 | V2 | P | OS-METADATA |||||||||
|---|---|---|---|---|---|---|---|---|---|---|---|---|---|
| | | | | | Ra | Ga | Ba | Rl | Rh | Gl | Gh | Bl | Bh |
| 0001 | 0001-01 | (10,20) | (100,200) | 30 | 8 | 20 | 150 | 4 | 20 | 15 | 60 | 120 | 180 |
| 0001 | 0001-02 | (0,0) | (70,110) | 15 | 38 | 10 | 50 | 20 | 45 | 5 | 15 | 25 | 75 |
| 0001 | 0001-03 | (55,25) | (400,125) | 70 | 94 | 60 | 50 | 70 | 110 | 50 | 70 | 25 | 75 |
| 0002 | 0002-01 | (170,210) | (457,210) | 25 | 81 | 90 | 15 | 71 | 91 | 75 | 104 | 5 | 25 |
| 0003 | 0003-01 | (92,5) | (209,205) | 50 | 94 | 29 | 70 | 60 | 100 | 20 | 34 | 50 | 99 |
| 0004 | 0004-01 | (115,23) | (303,100) | 35 | 9 | 77 | 23 | 5 | 15 | 60 | 99 | 12 | 35 |
| 0005 | 0005-01 | (400,200) | (450,400) | 30 | 148 | 60 | 15 | 125 | 167 | 50 | 70 | 5 | 25 |
| 0005 | 0005-02 | (0,0) | (100,600) | 80 | 28 | 20 | 75 | 12 | 34 | 9 | 40 | 45 | 103 |

FIG. 5

| IMAGE-ID | V1 | V2 | OS-METADATA |||||||||||
|---|---|---|---|---|---|---|---|---|---|---|---|---|
| | | | P | Ra | Ga | Ba | Rl | Rh | Gl | Gh | Bl | Bh |
| 0001 | (10,20) | (100,200) | 30 | 8 | 20 | 150 | 4 | 20 | 15 | 60 | 120 | 180 |
| 0001 | (0,0) | (70,110) | 15 | 38 | 10 | 50 | 20 | 45 | 5 | 15 | 25 | 75 |
| 0001 | (55,25) | (400,125) | 70 | 94 | 60 | 50 | 70 | 110 | 50 | 70 | 25 | 75 |
| 0002 | (170,210) | (457,210) | 25 | 81 | 90 | 15 | 71 | 91 | 75 | 104 | 5 | 25 |
| 0003 | (92,5) | (209,205) | 50 | 94 | 29 | 70 | 60 | 100 | 20 | 34 | 50 | 99 |
| 0004 | (115,23) | (303,100) | 35 | 9 | 77 | 23 | 5 | 15 | 60 | 99 | 12 | 35 |
| 0005 | (400,200) | (450,400) | 30 | 148 | 60 | 15 | 125 | 167 | 50 | 70 | 5 | 25 |
| 0005 | (0,0) | (100,600) | 80 | 28 | 20 | 75 | 12 | 34 | 9 | 40 | 45 | 103 |

FIG. 6

SYSTEM AND METHOD FOR OPEN SPACE METADATA-BASED STORAGE AND RETRIEVAL OF IMAGES IN AN IMAGE DATABASE

CROSS REFERENCE TO RELATED APPLICATIONS

This application is a continuation of application Ser. No. 08/786,932, filed Jan. 23, 1997, now U.S. Pat. No. 5,901,245, by James Warnick. et. al., and entitled "Method and System for Detection and Characterization Open Space in Digital Images."

FIELD OF THE INVENTION

The invention relates generally to the field of visual information management, and in particular to computer-implemented processes for storing and retrieving images in an indexed image database.

BACKGROUND OF THE INVENTION

A homogeneous and contiguous region of an image where text, captions or figurative elements can be placed without hiding any important image contents is called open space, or alternatively, copy space, dead space, negative or empty space. Images having these regions of regular, low contrast, relatively smooth texture qualities are desirable for the placement of such textual or figurative elements. Images with these properties are commonly used in multimedia presentations, advertising and publishing, such as magazine covers, as well as in compositing operations. In such applications, large image collections are frequently searched to locate images with the desired open space(s). Current approaches to conduct such a search require extensive user involvement in properly assessing the collection images in terms of their open space properties, which are also called open space metadata. Open space metadata can include quantification of the open space depictive properties such as color, texture, shape, extent, and location. Previous methods employed to store and retrieve images containing open space relied on either user memory or paper records to retain the open space metadata for all images in the collection. User memory was frequently spread over several people and paper records were commonly misplaced. Both methods were prone to inaccurate retrieval of desired images containing open space. Computer-based systems, such as the KODAK™ Picture Exchange, provided users the ability to store large collections of images and to retrieve desired images containing open space through the use of manual cataloging of open space metadata. However, the process of manually cataloging the open space metadata for each image in the collection is tedious and prone to errors caused by the fatigue and emotional state of the human operators. Furthermore, manually assigned open space metadata is generally subjective and inconsistent. This often results in unreliable image retrieval and loss of productivity.

Therefore, there is a need for a system and method for storing and retrieving images based upon objectively identified and consistently characterized open space within the images.

SUMMARY OF THE INVENTION

The present invention is directed to overcoming the problems set forth above. One aspect of the invention is directed to a system for the storage of a digital image in an image database, the system comprising: (a) a processor; (b) means for automatically generating with said processor open space metadata independent of manually inputting data; and (c) means for storing the open space metadata along with the associated image in the image database.

It is accordingly an object of this invention to overcome the above-described shortcomings and drawbacks of the known art.

It is still another object to provide a computer-implemented system and method for storing and retrieving images from an indexed image database, wherein the index is based upon the open space in the images contained within the image database.

It is a further related object of this invention to allow for more efficient browsing of the contents of image collections for images containing open space which meets a specific open space requirement.

Further objects and advantages of this invention will become apparent from the detailed description of a preferred embodiment which follows.

These and other aspects, objects, features, and advantages of the present invention will become more fully understood and appreciated from a review of the following description of the preferred embodiments and appended claims, and by reference to the accompanying drawings.

BRIEF DESCRIPTION OF THE DRAWINGS

FIG. 5 is a diagram illustrating the structure of the image open space file;

FIG. 6 is a diagram illustrating the structure of the image metadata file;

To facilitate understanding, identical reference numerals have been used where possible to designate identical elements that are common to the figures.

DETAILED DESCRIPTION OF THE INVENTION

As used herein, computer readable storage medium may comprise, for example, magnetic storage media such as magnetic disk (such as floppy disk) or magnetic tape; optical storage media such as optical disc, optical tape, or machine readable bar code; solid state electronic storage devices such as random access memory (RAM), or read only memory (ROM); or any other physical device or medium employed to store a computer program or data.

Open space as used herein is defined as one or more completely bounded sub-regions of an image whose color and spatial properties appear visually uniform. Open space may or may not represent real world objects such as water, grass, or pavement. Also, a database as used herein is defined as a system of hardware containing one or more processors, computer readable storage medium and a software operating system, or alternatively one or more storage files on computer readable storage medium. A processor as used herein can include one or more central processing units (CPUs).

Figure 1:
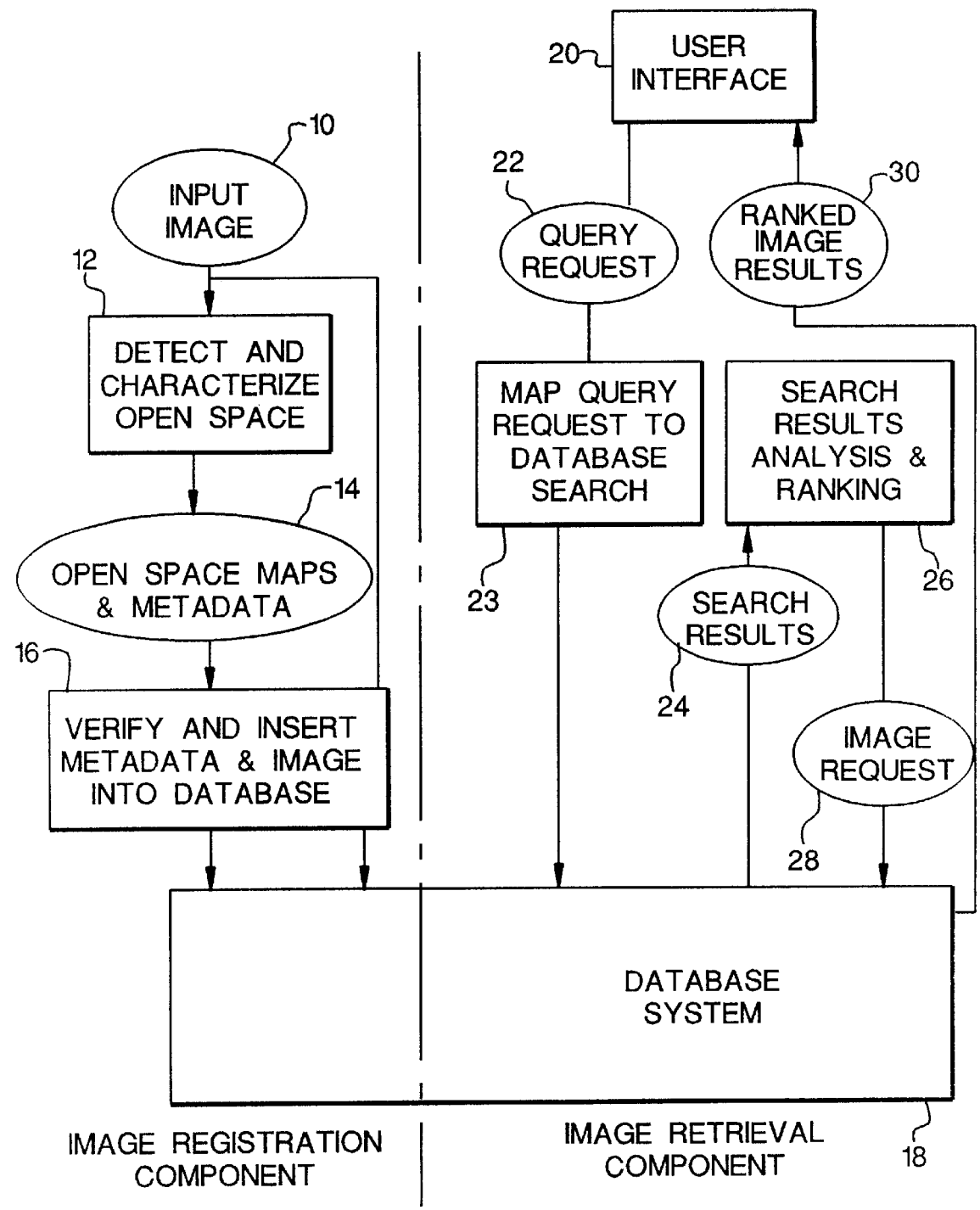
FIG. 1 is a diagram of a system for storing and retrieving images from a database based upon the detected and characterized open space within the images, according to a preferred embodiment of the present invention.

Referring to FIG. 1, there is shown a diagram of a system and method for the storage and retrieval of images containing open spaces from an image database. This system can function on a single computer hardware platform or general purpose computer, as indicated in FIG. 1, or as separate systems for the storage and retrieval components on multiple hardware platforms without departing from the scope of the invention. General purpose computers are well known in the art and will not be discussed herein. In the image storage component, the input image 10 is processed to detect and characterize the open space 12 as open space metadata 14 which is derived according to the depictive properties of the open space contained within the image. The open space metadata 14 are then verified and inserted 16 into the database system 18 along with the digital image 10. In the image retrieval component, a user interface 20 allows a user to formulate an open space query request 22. This query request is mapped 23 to a database search request 40 and the database 18 is searched for open space metadata 14 which satisfies the open space query request 22. The search results 24 are ranked 26 from best match. The images associated with the ranked open space metadata are requested 28 from the database 18 and presented 30 to the user through the user interface 20. The components for image storage and image retrieval are discussed in further detail below.

Image Storage Component

The following description of the preferred embodiment of the invention considers the input image to be a digital color image in the RGB color space. Those skilled in art will appreciate that other types of images in other color spaces can be processed without departing from the scope of the invention.

Figure 2:
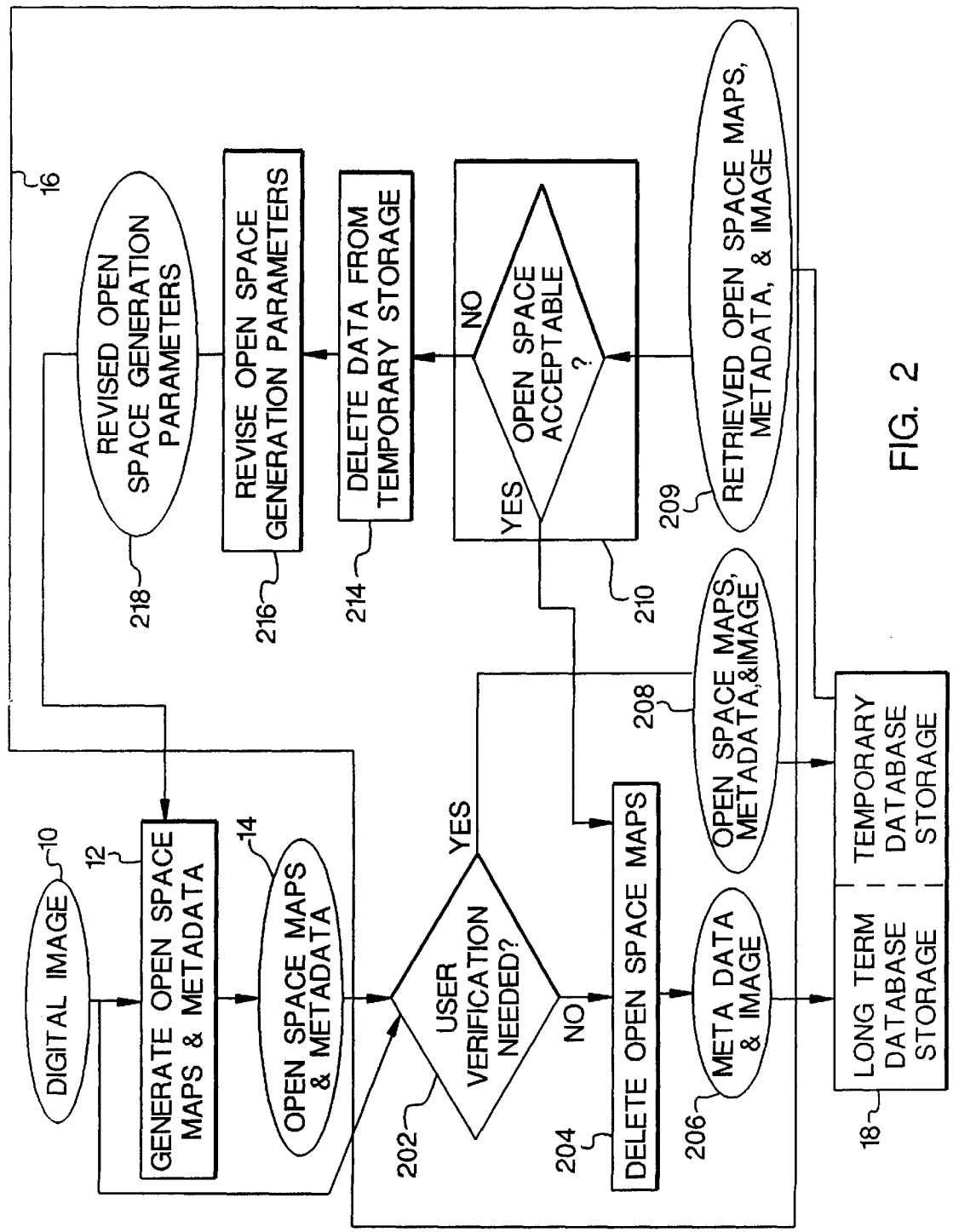
FIG. 2 is a flow chart of a computer-implemented method for the image storage component of the overall system, according to a preferred embodiment of the present invention.

Referring to FIG. 2, there is shown a flow chart of a computer implementation for the image storage component of the system. According to the present embodiment, an input digital image 10 is processed to generate 12 the associated open space maps and metadata 14. Those skilled in the art will appreciate that the input digital images 10 may be provided directly from a digital source, such as a digital electronic camera or graphic arts application on a computer, or may be produced from a photograph or art work by scanning. Additionally, it will be appreciated by those skilled in the art that an input digital image 10 can be a monochromatic or color image or a monochromatic or color frame from a motion picture sequence or video sequence. Alternatively, multiple still images, multiple frames from a motion picture sequence or video sequence can be processed as a sequence of still images without departing from the scope of the invention.

The following detailed description is based upon the processing required for a single input image. Similar processing can be employed for a batch operation mode wherein a set of input images are processed sequentially as single images. Given an input digital image 10, the process of generating the open space map(s) and associated metadata 12 involves detection of all desired open spaces present in that image and computing the metadata for each of the detected open spaces. The present embodiment employs the open space detection method described in the co-pending and commonly assigned patent application Ser. No. 08/786, 932 entitled "Method and System for Detection and Characterization Open Space in Digital Images" to detect open space, generate open space maps and compute associated open space metadata. For a given image 10, every detected open space region can be depicted in the form of a binary image containing open and closed segments; the open space regions identified by a pixel value of one and non-open space regions identified by a pixel value of zero. This binary image is referred to as an open space map as it spatially identifies the detected open space regions in the image 10.

Figure 4:
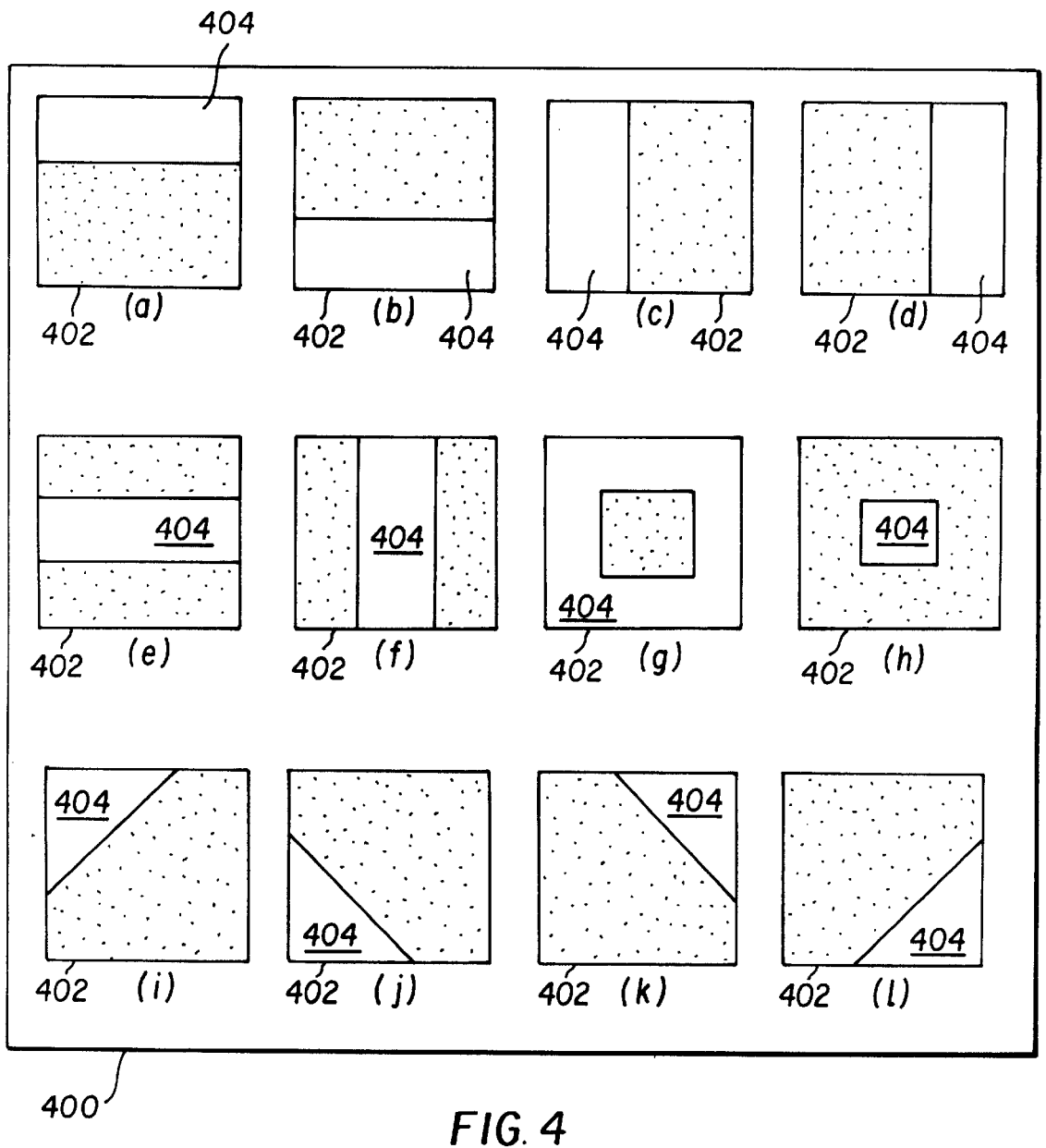
FIGS. 4A–L are diagrams illustrating a possible set of open space templates.

In the hereinbefore referenced method and system for detection and characterization of open space, a set of open space templates are used to defined the open space general location, or types, to be searched for open space within the image. FIG. 4 illustrates a possible set 400 of open space templates 402 that can be employed for this purpose. Each open space template 402 defines a small search region 404 that is examined to detect the presence of open space within the image 10. Each template 402 in the set of templates 400 defines an open space type such as top (FIG. 4A), bottom (FIG. 4B), left (FIG. 4C), right (FIG. 4D), and so forth. Thus, for an image 10 with N open space regions, there will be N open space maps, one for each open space type detected in the image. The set of templates 400 can be general in nature as indicated in FIG. 4 of can be domain specific, i.e., selected to represent a predetermined number of specific open space types required for a specific application. For example, a magazine publisher might want to store and retrieve only those images whose open space location matches that required for a magazine cover whose text, such as title and list of contents, are unchanging from issue to issue. In another example, a user may wish to create a composite image from several other images, where at least one image will need to have sufficient open space for a background, and the other images with sufficient open space around the individual elements to make a clean digital cut-out. A query to an image database with open space maps defined for image data will provide an automatic method to retrieve the best candidate images for the user task. Alternatively, a single open space map can be created which identifies all of the detected open and non-open space segments of the image 10. This is equivalent to having a set of templates 400 containing a single open space template 402 in the in which the search region 404 encompasses the entire image. The single open space map will thus identify all open space regions within the image 10.

As in the hereinbefore referenced method and system for detection and characterization of open space, the user has the option to verify 16 the detected open spaces and metadata prior to insertion into the database 18. If the user verification option is selected, one of the following two sub-options is then selected for the generation and storage of open space maps:

(i) generate a separate open space map for each detected open space type as determined by the set of open space templates 400, in which case there will be multiple open space maps associated with the image 10 (one map for each detected open space region in the image 10); or (ii) combine the individual open space maps generated in (i) for each type of open space into a generate a single, composite open space map for the image 10, in which case there will be at most one open space map associated with the image 10.

Either of these sub-options can be selected for use with the user verification of the open space processing of the image 10. If the user verification option is not enabled, the image registration component of the system automatically processes the image 10 to produce separate open space maps and the open space metadata associated with each as described in (i) hereinabove.

Figure 3:
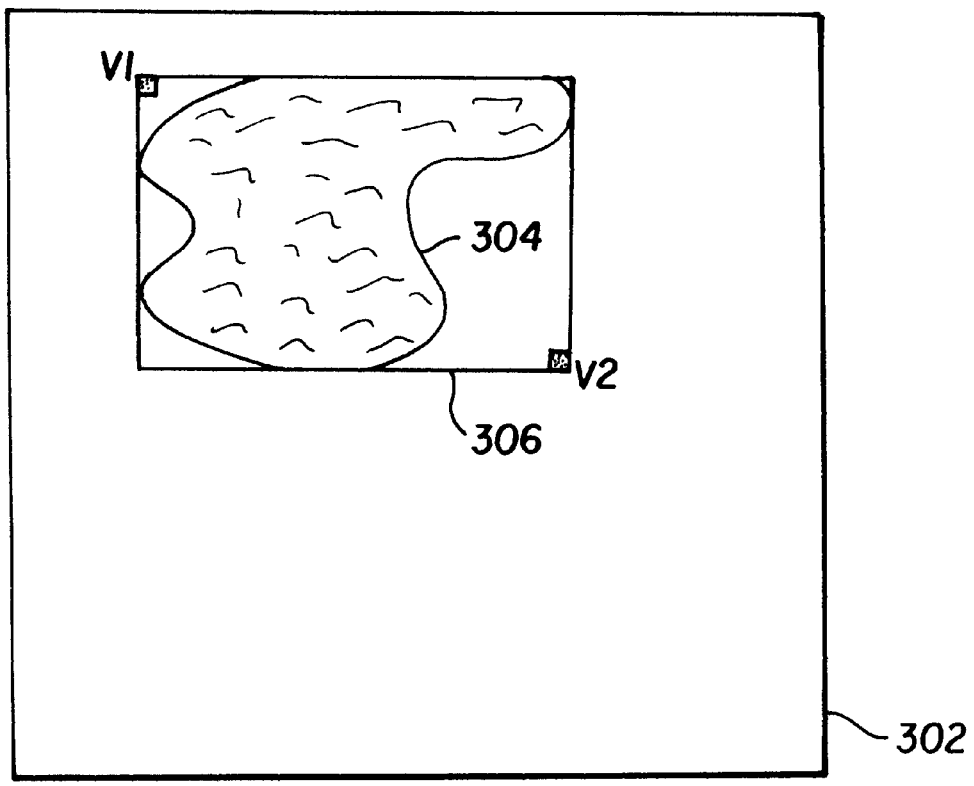
FIG. 3 is a diagram illustrating the fitting of a bounding rectangle to detected open space within an open space map.

Open space metadata 14 includes a number of quantified open space region depictive properties. As described herein the above referenced co-pending and commonly assigned patent application, detected open space can be quantified by a set of color, texture, location, and shape properties. In the preferred embodiment of the invention, we consider a smoothly textured region as an open space and quantify detected open space by a set of four depictive properties: open space extent, open space openness, and two color properties. Referring to FIG. 3, an open space map 302 is generated using the method described in the previously referenced co-pending and commonly assigned patent application. The extent of the open space 304 is defined by the smallest size bounding rectangle 306 which completely encloses the detected open space region. The open space extent is then quantified by the coordinates (x,y) of the top left vertex V1 and the bottom right vertex V2 of the bounding rectangle. Those skilled in the art will appreciate that any type of bounding geometric structure, such as a rectangle, triangle, polygon, or conic section can be used to describe the extent of an open space without departing from the scope of the invention. The percentage P of the bounding rectangle's (or other extent defining geometric structure's) area occupied by the open space region is used to quantify open space openness.

In the preferred embodiment, open space color quantification has two components: the open space average color {Ra, Ga, Ba} and the open space color range {Rl, Rh, Gl, Gh, Bl, Bh}. For the RGB color space, the open space average color is preferably quantified as the mean value of the red, green and blue pixel values of the color components in the detected open space region. Alternatively, the median or mode value of the red, green and blue pixel values may be used in lieu of the mean value. The open space color range is quantified by the lowest and highest values of each color component in the open space region. In the preferred embodiment for an RGB color image, the range of each of the red, green, and blue pixel values in an open space region are quantified as the open space color range.

Thus, open space metadata is of the form <{V1, V2 }, P, {Ra, Ga, Ba}, {Rl, Rh, Gl, Gh, Bl, Bh}>, where V1 denotes the coordinates (X1,Y2) of the upper left vertex of the bounding rectangle and V2 denotes the coordinates (X2,Y2) of the upper right vertex of the bounding rectangle, Ra, Ga, Ba are the average color component pixel values of red, green, and blue respectively, and (Rl, Rh), (Gl, Gh), and (Bl, Bh) are the ranges (lowest value 1, highest value h) of red, green, and blue color component pixel values in the detected open space.

Alternatively, the color properties of the open space can be represented by {Ra, Ga, Ba} {Rv, Gv, Bv}, {Rs, Gs, Bs} in the RGB color space. Here {Ra, Ga, Ba} is, as before, the average color pixel values, {Rv, Gv, Bv} is the color variance pixel values, and {Rs, Gs, Bs} is the color skew pixel values. In this scheme, the open space color properties are represented by a 9 element vector, i.e., an open space color is a point in a 9-dimensional space.

In yet another embodiment of the invention, the three color component pixel values used to define any of the open space color properties can be mapped to a semantic label, or name, such as "Red," "Purple," "Brown," and the like. (see K. L. Kelly, "Color Designations for Light", Journal of the Optical Society of America, Vol. 33, No. 11, pp. 627–632, 1943 and R. M. Boynton and C. X. Olson, "Locating Basic Colors in the OSA Space", Color Research and Application, Vol 12, pp. 94–105, 1987). With this embodiment, color component pixel values are mapped to a semantic name through the use of a lookup table (LUT). The X Window System provides such a LUT in the form of a color name database for mapping between color names and RGB color values (see A. Nye, "The Xlib Programming Manual for Version 11 of the X Window System", Volume One, pp. 187–188, 1990). For example, with this color name LUT the semantic names of "red," "light blue," and "khaki" are mapped to the RGB color component values of 255R 0G 0B, 191R 216G 216B, and 159R 159G 95B respectively. Additionally, this color name LUT can be used to map from a RGB color component value to a semantic color name by finding the closest RGB value in the LUT and assigning it the corresponding semantic name in the LUT. A similar LUT can be constructed for the mapping between open space extent and semantic name. For example, the open space extent shown in FIGS., 4A and 4J can be mapped to the semantic name "top rectangle" and "bottom left triangle" respectively. With this embodiment, the open space metadata are quantified in terms of semantic names in addition to or in lieu of specific numerical quantities.

Those skilled in the art will recognize that other open space characteristics and/or detection methods can be employed to either detect open space and/or generate open space metadata without departing from the scope of the invention. Additionally, manually entered open space and/or image properties can be used as open space metadata without departing from the scope of the invention.

As mentioned hereinbefore, the user can elect to store detected open space map(s) and/or metadata for later review for acceptability. Referring again to FIG. 2, if the user verification option 202 is not elected, the open space maps are deleted 204 and the image and metadata 206 are inserted into long term storage in the database 18. If the user verification option 202 is elected, the open space maps, metadata, and image 208 are inserted into temporary storage in the database 18. In the preferred embodiment of the invention, the open space map(s) are needed only for the user verification and not for open space retrieval. Therefore, they need only be stored temporarily in the database and are normally deleted 204 after the user verification process. The user can verify the detected open space metadata by retrieving the open space maps, metadata, and image 209 from temporary storage and displaying them via a user interface 210 for visual review. If the detected open space maps or metadata are found unacceptable 210, the database 18 is updated to delete 214 the unacceptable open space maps, metadata, and image from temporary storage. The user then revises 216 the open space generation parameters which are then used for the generation 12 of revised open space maps and metadata 14. This review process continues until the detected open space maps and associated metadata 14 are acceptable, at which point the open space maps are deleted 204 from the temporary storage in the database 18 and the remaining open space metadata and image 206 are inserted into long term storage in the database 18.

In the preferred embodiment, the generated open space maps, necessary for automatic characterization of the detected open spaces, are automatically deleted and no temporary storage is required. Optionally, the open space maps can be stored as additional open space metadata either as a separate file or within a structured storage format image file with the digital image 10 in the database 18, as in the FLASHPIX™ image file format (see FLASHPIX™ format specification, Version 1.0, Sep. 11, 1996).

Any commercial database management system or a set of flat files can be used to store and organize the image 10, the associated open space maps, and metadata 14. In the preferred embodiment of the invention, each input image 10 is stored as a separate file on a secondary or tertiary storage device (e.g., magnetic tape, hard disk, CD, optical disk, or jukebox) and is identified by a unique id, hereafter referred to as the image-id. This image-id acts as the image file locator (or address of the location of the image file). Similarly, each open space map is stored as a separate file on a secondary or tertiary storage device (e.g., magnetic tape, hard disk, CD, optical disk, or jukebox) and is identified by a unique id, hereafter referred to as the os-map-id. In the preferred embodiment of the invention, two secondary storage resident files are employed. One of these files, which is called IMAGE_OPENSPACE and whose structure is illustrated in FIG. 5, contains records of the form <image-id, os-map-id, os-metadata>. The second file, which is called IMAGE_METADATA and whose structure is illustrated in FIG. 6, contains records of the form <image_id, os-metadata>. Here, os-metadata is the metadata associated with one of the detected open spaces in the input image associated with image-id. As mentioned hereinbefore, the form of os-metadata is <{V1, V2}, P, {Ra, Ga, Ba}, {Rl, Rh, Gl, Gh, Bl, Bh}>.

The IMAGE_OPENSPACE file is used to temporarily stored information pertinent to the computed open space maps and metadata that is required to be verified by the user. This file is used to retrieve open space map(s) and metadata associated with a given image for the user verification. If, in the user verification phase, an open space map and/or associated metadata is found unacceptable, the pertinent record(s) are deleted from the IMAGE_OPENSPACE file and the associated os-map-id file is deleted from the database. If the open space map(s) and metadata are found acceptable, then the os-map-id file is deleted and the image-id and the os-metadata field form a record which is inserted into the IMAGE_METADATA file. Once accepted, the IMAGE_OPENSPACE records pertinent to the accepted os-map-id are then deleted.

The IMAGE_METADATA file is used for processing the image retrieval requests in the image retrieval component. Note that the file IMAGE_OPENSPACE is empty or nonexistent, and no open space map files exist in the database when user verification option is not selected or when there is no data to be verified. When the option of generating composite open space map is selected by the user, there can be multiple records with the same image-id and os-map-id pair, but different os-metadata in the IMAGE_OPENSPACE file. If the multiple open space map generation option is selected, there is one record per os-map-id and image-id pair in this file. In other words, for an image-id with N different open spaces, for the composite open space map option, there will be N records in the IMAGE_OPENSPACE file with the same image-id and os-map-id, but different os-metadata. In case of the separate open space map generation option, there will be N records with same image-id but different os-map-id and os-metadata. In the IMAGE_METADATA file there will be N records, each corresponding to a detected open space map. Note that it no open space is detected in an input image, os-map-id and os-metadata fields will be empty (or NULL).

In the present embodiment, for each of the four fields of os-metadata, a separate search index structure is created for searching or randomly accessing the IMAGE_METADATA file. The open space extent defines a rectangular region is a two-dimensional space. Similarly, the open space color range defines three-dimensional rectangular space in a three-dimensional space. Both of these fields are spatial data and, therefore, any spatial data index structure can be used to create these indices. For example, an index such as an R tree (see A. Guttman, "A Dynamic Index Structure for Spatial Search," *Proc. ACM SIGMOD Int. Conf. on Management of Data*, 1984, pp. 47–57), or an R* tree (see N. Beckmann & H-P. Kriegel, "The R*-tree: An Efficient and Robust Access Method for Points and Rectangles," *Proc.* 1990 *ACM SIGMOD Int. Conf. on Management of Data*, 1990, pp. 322–331) can be employed to index these fields. In the preferred embodiment of the invention, the open space extent and open space color range indices are based on an R*-tree.

Since the open space average color is a point in a three-dimensional space, any multidimensional point data index structure can be used to create this index. For example, an index such as a k-d-b tree (see J. T. Robinson, "The K-D-B Tree: A Search Structure for Large Multidimensional Dynamic Indexes," *Proc. ACM SIGMOD Int. Conf On Management of Data*, 1981, pp. 10–18), a BD tree (see S. P. Dandamudi and P. G. Sorenson, "Algorithms for BD Tree," *Software-Practices and Experience*, Vol. 16(12), Dec. 1986, pp. 1077–1096), a G tree (see A. Kumar, "G Tree: A New Data Structure for Organizing Multidimensional Data, *IEEE Trans. Knowledge and Data Engineering*, Vol. 6(2), Apr. 1994, pp. 341–347) or a grid file (see J. Nievergelt, H. Hinterberger, and K. Sevcik, "The Grid File: An Adaptable, Symmetric Multikey File Structure," *ACM Trans. Database Systems*, Vol. 9(1), 1984, pp. 38–71) can be used to create the open space average color index. In the preferred embodiment of the invention, a k-d-b tree based index is employed for open space average color indexing.

Since open space openness, a scalar value (0–100%), is a single point in a single dimensional space, any single dimensional point data index structure can be used to create this index. For example, a B tree (see D. Comer, "The Ubiquitous B-tree", *Computing Surveys*, Vol. 11, No. 2, 1979, pp. 121–137) can be used to create the open space openness index. In the preferred embodiment of the invention, a B tree based index is employed for open space openness indexing.

Those skilled in art will recognize that other storage and organization schemes can be employed with the database without departing from the scope of the invention. Additionally, it alternate open space properties are used as open space metadata, alternate search mechanisms (e.g., index structures) can be employed for retrieval involving those alternate properties without departing from the scope of the invention.

Image Retrieval Component

Figure 7:
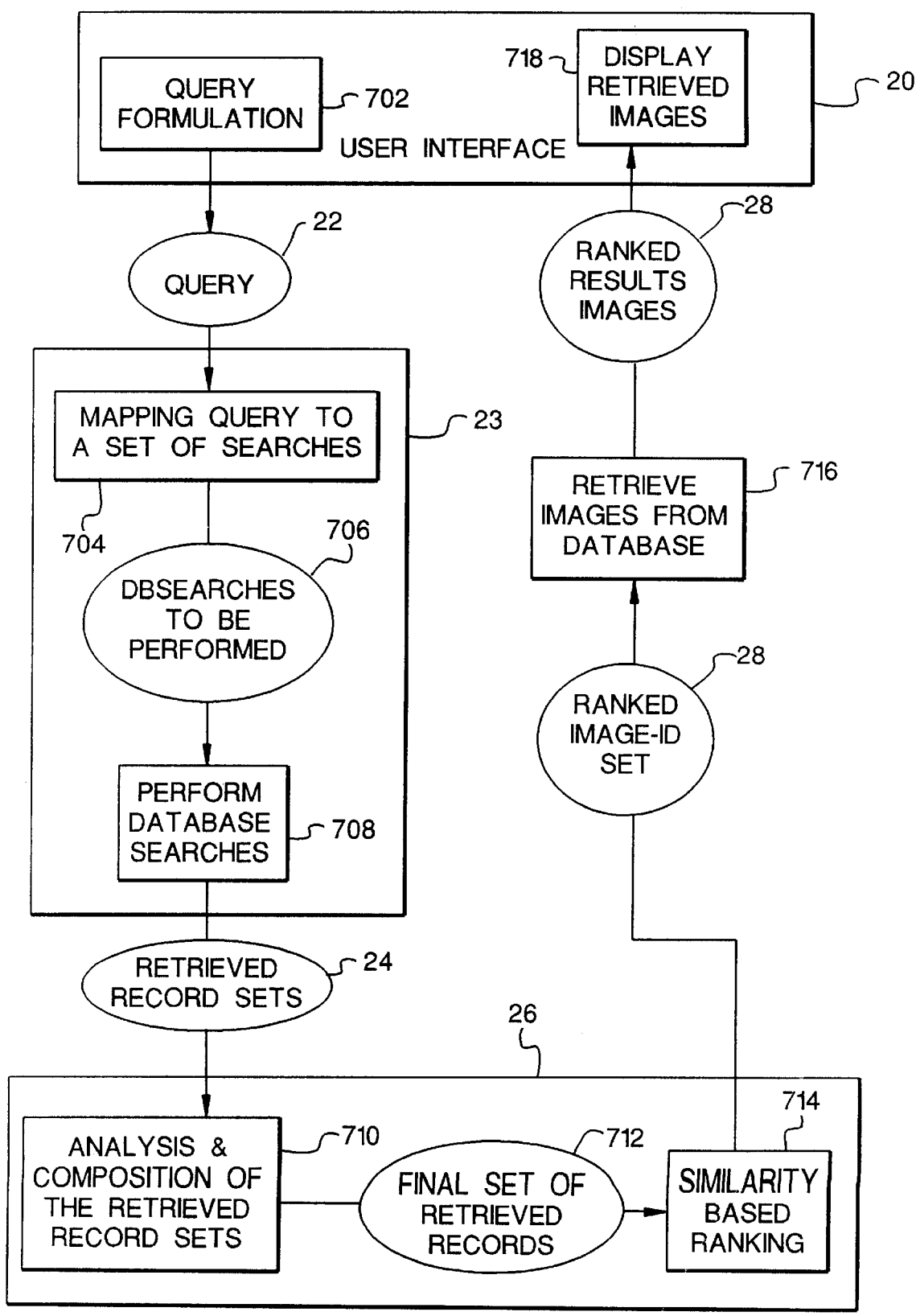
FIG. 7 is a flow chart of a computer-implemented method for the image retrieval component of the overall system, according to a preferred embodiment of the present invention.

Referring to FIG. 7, there is shown a flow diagram of a computer-based implementation of the image retrieval component of the system. According to a present embodiment of the invention, a user interface 20 allows the user to formulate 702 an open space search request, or query 22. The query 22 provides desired constraint values for some or all of the os-metadata fields in the IMAGE_METADATA file. A given open space query 22 request is mapped 704 to an ordered set of one or more index-based searches 706. The database 18 is searched 708 in order to locate the matching set of records in the IMAGE_METADATA file. The record set 24 obtained by the various searches 708 are logically combined 710 (using set operations such as union, intersection, difference, etc.) to produce the final set of retrieved records 712 which are further analyzed for similarity-based ranking 714 in order to obtain the ranked set of image-ids that forms the final result of the query 22. The images, identified by the image-ids in the final result set, are retrieved 716 and displayed 718 in the rank order via the user interface 20.

The image retrieval component is composed of three major operations, open space query formulation, database search, and organization of results, each of which is described in further detail hereinbelow.

Open Space Query Formulation

Figure 8:
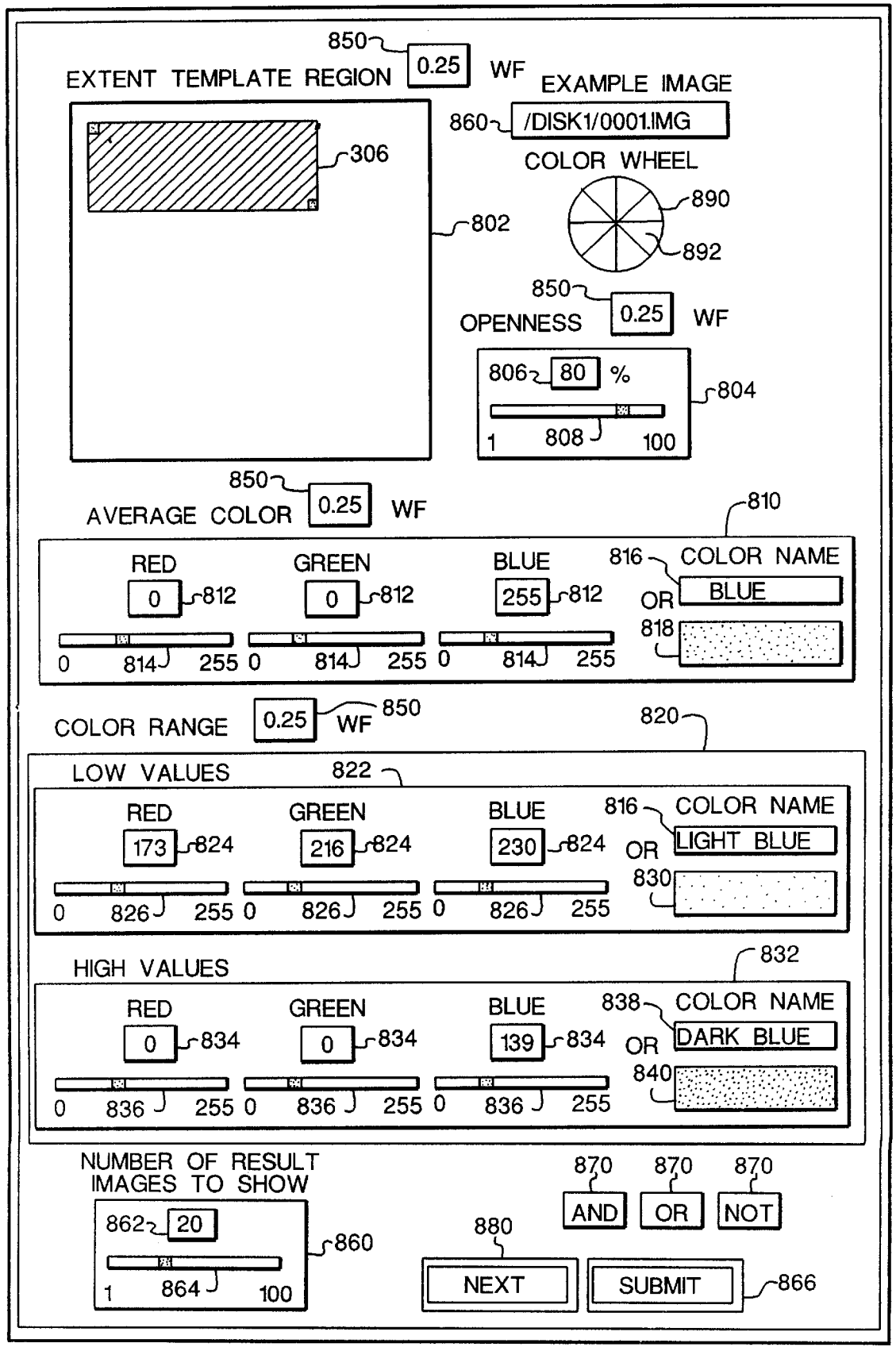
FIG. 8 is a diagram illustrating a typical user interface for formulating a search.

The user formulates a database query by identifying the open space metadata values, or constraints, desired for one of more os-metadata fields. The following two major classes of queries (or retrieval requests) are possible in the preferred embodiment:

(i) Single Open-space-Metadata Constraint Specification Query: These are queries that specify at most one value or constraint per os-metadata component. Images within the database 18 which contain an open space which match the specified open space constraint properties in the query will be retrieved. In the case where multiple os-metadata field values, or constraints, are specified, logical and, or, and not operations can be used to formulate a more complex query. Referring now to FIG. 8, there is shown a diagram illustrating the query formulation part 702 of a user interface 20 for entering the desired open space constraint parameters necessary for an open space search. The user interface enables the user to specify the desired open space extent {V1,V2} by constructing a bounding structure 306 within an extent template region 802 using a drawing tool. The extent template region 802 also allows the user to locate the bounding structure within the image. The open space openness P can be specified 804 as the percentage of open space desired within the bounding structure. This value can be entered either by directly inputting the value 806 or through the use of a slider bar 808 to adjust the openness value within the range allowed.

The user interface 20 also allows the user to specify 810 the color component values {Ra, Ga, Ba} of the open space average color. These color component values can be either typed in directly 812 or slider bars 814 can be used to adjust each color component value within the range allowed. Optionally, one of the listed standard color names can be selected 816 for the open space average color in place of providing individual color component values. As discussed in the image storage component hereinbefore, associated with each listed standard color name is a set of pre-defined color component values contained in a lookup table (LUT). This LUT is used to map selected color names to the appropriate color component values. When either the color component values or a standard color name is entered, a sample color area 818 is set to the designated open space average color for visual verification.

The color component values {Rl, Rh, Gl, Gh, Bl, Bh} of the open space color range can be specified 820 by entering the color component low values {Rl, Gl, Bl} 822 either directly entering 824 the component value or through the use of slider bars 826 to adjust the color component low values within the range allowed. Optionally, one of the listed standard color names can be selected 828 in place of providing individual color component low values. When either the color component low values or a standard color name is entered, a sample color area 830 is set to the designated open space color range low value 822 for visual verification. In a similar fashion, the color component high values {Rh, Gh, Bh} 832 can be entered either directly 834 or through the use of slider bars 836 to adjust the color component high values within the range allowed. Optionally, as with the color component low values 822, one of the listed standard color names can be selected 838 in place of providing individual color component high values. When either the color component high values or a standard color name is entered, a sample color area 840 is set to the designated open space color range high value 832 for visual verification.

As an alternative to specifying the individual color component values for open space average color and open space color range, the user can select a color from a color wheel 890 which contains a plurality of individual color samples 892. The color component values for the selected color sample 892 will be used for open space average color and/or open space color range query parameters.

When the option to use a standard color name for the open space average color is selected, an associated set of open space color range component values is set by default. The user can adjust these values to meet any specific application by changing the individual open space color range component values directly or through the use of the slider bars discussed hereinbefore.

As an alternative to explicitly specifying the open space query parameters, the user can specify 860 an example image containing open space of the type desired. An appropriately scaled version of this example image is displayed in the open space extent region 802 for visual verification. The explicit query values for open space extent, open space openness, open space average color, and open space color range will be extracted from this image using the same process described in the image storage component hereinbefore. Optionally, the user can place a bounding structure 306 on the example image displayed in the extent template region 802 in order to specify the color component values for open space average color and or open space color range. The average color values and or the color range values will be extracted from the example image in the template region and used for the open space average color and or open space color range query parameters.

Each open space query parameter has a weighting factor 850 so that emphasis can be placed on selected open space query parameters if so desired. For example, if open space average color is more important that the other parameters, a larger weighting factor 850 can be entered for that parameter than for the other parameters. The query results are ranked based upon the individual parameter weighting factors 850 selected by the user. The default is an equal parameter weighting factor 850 for each open space parameter so that each parameter has equal emphasis in the results ranking.

Finally, the user can specify the number of result images to be displayed 860 after the query has completed. This value can be entered either by directly typing the value 862 or through the use of a slider bar 864 to adjust the value within the range allowed. Once all of the open space constraint values have been selected, the user submits 866 the query request 22.

A query of this class is mapped 23 to the corresponding metadata field-based searches of the database 18 using the index structures described hereinabove. The user need not specify constraint values for all of the os-metadata fields. If a single field is specified, only the index structure associated with that osmetadata field will be used to search the database 18. For example, a search could be conducted using only the open space extent and open space average color. All other os-metadata fields would be ignored and not contribute to the database search results 30 presented to the user 718.

(ii) Multiple Open-Space-Metadata Constraint Specification Query: These queries involving specifications of multiple os-metadata constraint values connected by logical operators 870 (and, or, and not). A query of this class is actually a composition of multiple queries of the above class. An example of such a query is to find images that have blue colored open space located near the top and red colored open space in the lower left corner. Each of these open spaces would have its own set of os-metadata from which the search request will be formulated. To process such a query, each of the single open-space-metadata constraint specification query is formulated as described in (i) hereinabove followed by the logical composition operator 870. The user then specifies the next 880 constraint specification query as described in (i) hereinabove. When all of the queries have been specified, the user submits 866 the query request 22. The results are analyzed and ranked 26 and presented 718 to the user.

Alternatively, if neither a example image nor constraint values for the os-metadata fields are specified by the user, the system reverts to a database browsing mode of operation. The images contained in the database are displayed to the user ranked only by image-id, i.e., displayed in the order in which they were added to the database.

Those skilled in the art will appreciate that other depictive properties of open space can be specified through the use of the user interface without departing from the scope of the invention.

Searching the Database

For a search, the appropriate index (corresponding to the specified open space metadata field) is used to identify and retrieve the records of the IMAGE_METADATA file that satisfy the search or similarity criteria. For example, an extent based search locates and retrieves all records of the IMAGE_METADATA file having the open space extent (or bounding rectangle) that partially or fully overlaps the specified open space extent (bounding rectangle) using the R* tree-based extent index as hereinbefore described. Similarly, the open space color range-based search uses the R* tree based color range index to locate and retrieve all records in the IMAGE_METADATA file having the open space color range (a rectangular volume) that partially or fully overlaps the specified open space color range (or the rectangular volume). An open space average color-based search uses the k-d-b tree based average color index to locate and retrieve all records in the IMAGE_METADATA file having the open space average color value of the os-metadata within a threshold distance from the specified open space average color value. An open space openness-based search uses the B-tree based index structure to located and retrieve all records in the IMAGE_METADATA file having the open space openness value of the os-metadata within a threshold of the specified open space openness value. This openness threshold can be set by the user, or a default value can he employed.

Organizing the Results of the Search

Figure 9:
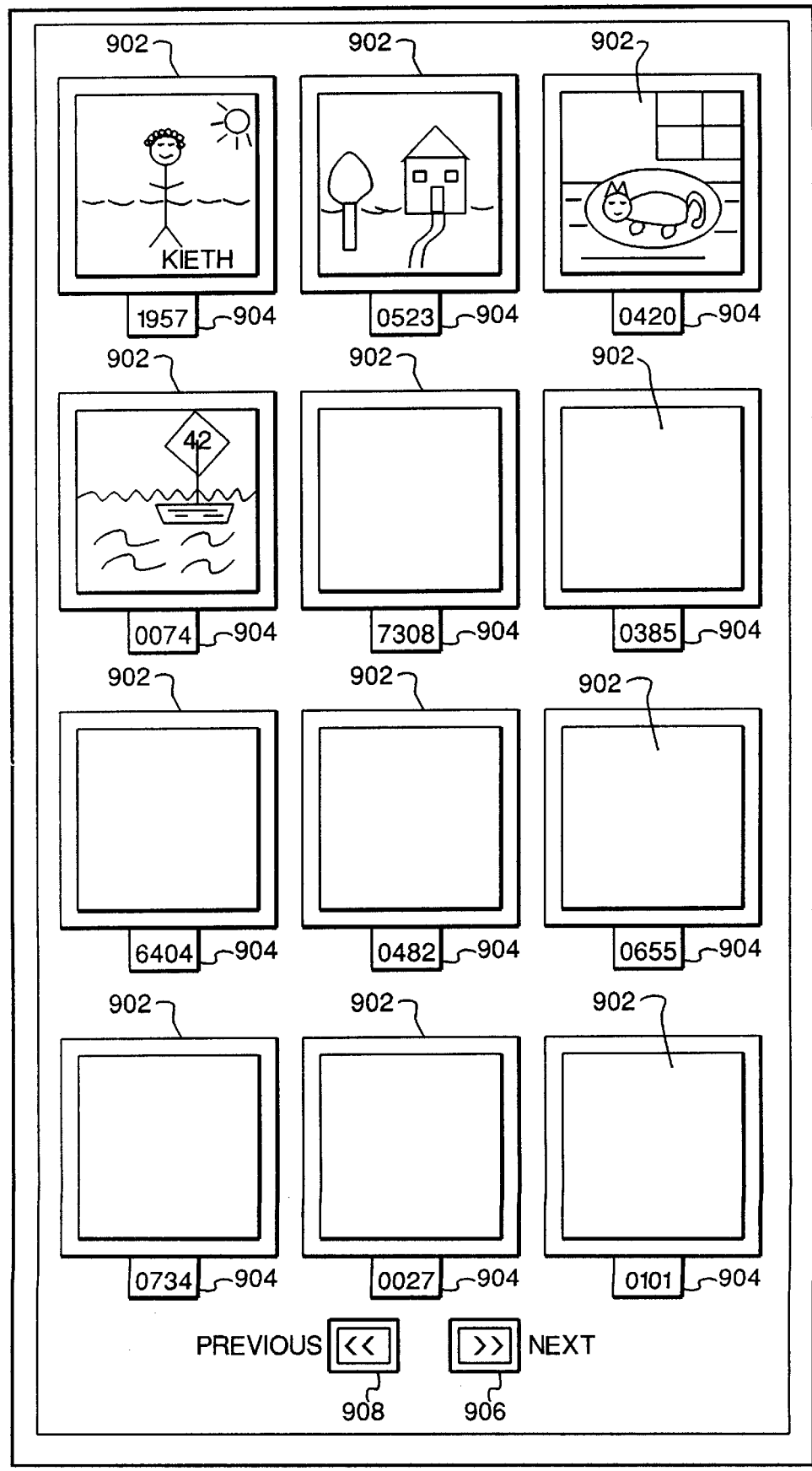
FIG. 9 is a diagram illustrating a typical user interface for visual review of the search results.

The logical operators used in the query determine the logical operations required to be performed on the record sets obtained from the individual searches in order to derive the final record set. The os-metadata components of the records in the final set are further analyzed to obtain the set of ranked image-ids. The rank of an image-id is determined by the degree of similarity between its os-metadata as represented in the final record set and the query specified metadata. The degree of similarity is determined by the similarity of the individual metadata components and the relative weights of the metadata components. Default or used assigned weights of the metadata component are used. For instance, the open space extent similarity is a function of the overlapping and non-overlapping areas of the two bounding rectangles. Similarly, the open space color range similarity is also a function a function of the overlapping and non-overlapping volumes. Similarity thresholds are used to reduce the size of the set of image-ids that are ranked for the retrieval and display of the response images. Referring to FIG. 9, there is shown a diagram illustrating the results display part of a user interface 20 necessary for visual review of the ranked results of the database search. In the preferred embodiment, the individual images 902 identified by the search as containing open space which matches the query are displayed in ranked order starting in the upper right with the image whose detected open space best matches the open space query. The result images are displayed along with their associated image-id 904 for reference. Since the display user interface can only display a finite number of ranked result images which may be less than the total number of result images requested 860, a means 906 is provided that allows the user to move down in the ranking to the next set of result images. Similarly, a means 908 is provided that allows the user can move up in the ranking from the display of lower ranked result images to the higher ranked result images.

With either class of query described hereinbefore, the user visually examines the search results via the user interface 718. If the user finds a close match to the desired open space image, a means 910 is provided to use the osmetadata from the close match image as the open space constraint values in a subsequent search of the database 18. The user is thus provided a method for refining the search results until the images containing the desired open space depictive properties are retrieved.

In summary, the hereinabove system and method detects and characterizes the open space in images as open space metadata, stores the open space metadata and associated images in a database. A user queries the database in search of images containing specific open space properties, which the system returns to the user in a ranked order.

The invention has been described with reference to a preferred embodiment. However, it will be appreciated that variations and modifications can be effected by a person of ordinary skill in the art without departing from the scope of the invention.

PARTS LIST

10 digital image
12 open space
14 open space metadata
16 database
18 database system
20 user interface
22 open space query request
23 map
24 search results
26 rank
28 database
30 parameters
202 user verification option
204 delete
206 image and metadata
208 open space maps, metadata, and image 209 retrieved open space maps, metadata, and image
210 user interface
212 delete data
214 delete data
216 revise parameters
218 revised parameters
302 open space map
304 open space
306 bounding structure
400 set of templates
402 open space templates
404 search region
702 query formulation
704 mapping query
706 index-based searches
708 database searches
710 analysis and composition
712 final set of retrieved records
714 ranking
716 retrieve images
718 display images
802 template region
804 open space value
806 value
808 slider bar
810 average color values
812 direct color input
814 slider bars
816 color name selection
818 sample color area
820 color range values
822 color component low values
824 direct color input
826 slider bars
828 color name selection
830 sample color area
832 color component high values
834 direct color input
836 slider bars
838 color name selection
840 sample color area
850 weighting factor
860 example image
862 direct input
864 slider bar
866 submit
870 logical operators
880 next
890 color wheel
892 color sample
902 individual images
904 image ID
906 next means
908 previous means

What is claimed is:

1. A system for the storage of a digital image in an image database, the system comprising:
   (a) a processor;
   (b) means for automatically generating with said processor open space metadata from the digital image independent of manually inputting data; and
   (c) means for storing the open space metadata along with the associated image in the image database.

2. The system as in claim 1, wherein said processor is a programmable computer.

3. The system as in claim 2, wherein said storing means is remotely located with respect to said general purpose computer.

4. The system as in claim 2, wherein the open space metadata includes depictive properties of open space comprising color, texture, shape, orientation and location.

5. The system as in claim 4, wherein the color, texture, shape, extent and location are expressed as semantic names.

6. The system as in claim 2, wherein the open space metadata includes individually or any combination of open space extent, open space openness, open space average color and open space color range.

7. The system as in claim 6, wherein said open space extent includes spatial coordinates of a bounding shape that encompasses the identified open space.

8. The system as in claim 7, wherein said open space openness includes a percentage occupied by the open space of a bounding shape that encompasses the open space.

9. The system as in claim 8, wherein said open space average color includes individually or any combination of the average of the color component pixel values of pixels in the open space, the variance of the color component pixel values of pixels in the open space, and the skewness of the color component pixel values of pixels in the open space.

10. The system as in claim 9, wherein said open space color range includes a range of color component pixel values of the open space.

11. The system as in claim 2, wherein said generating means includes means for generating an open space map.

12. The system as in claim 11, wherein said generating means includes means for user verification of open space metadata.

13. The system as in claim 1, wherein said storing means includes indexed storage for efficient processing.

14. A system for the retrieval of images from an image database based upon the characteristics of open space in the images contained in the image database, the system comprising:
   (a) a processor;
   (b) means for transmitting a user specified open space search request to the processor;
   (c) means for retrieving with the processor images from the image database which match the open space search request;
   (d) means for automatically ranking with the processor the retrieved open space images from the image database so that images are ranked in descending order of match to the search request; and
   (e) means for presenting the ranked image results of the image database query to the user.

15. The system as in claim 14, wherein said retrieving means includes retrieval by an indexed search for efficient processing.

16. The system as in claim 14 further comprising means for specifying the desired depictive properties of open space.

17. The system as in claim 16, wherein the search request includes searching on either one or all of a plurality of depictive properties of open space comprising open space extent, open space openness, open space average color and open space color range.

18. The system as in claim 17, wherein the search request includes weighting the depictive properties of open space in the search request.

19. The system as in claim 16, wherein said specifying means includes a graphical user interface for providing search parameters.

20. The system as in claim 19, wherein said graphical user interface includes a scroll bar for adjusting search parameters.

21. The system as in claim 19, wherein said graphical user interface includes means for entering a semantic name for adjusting search parameters.

22. The system as in claim 19, wherein said graphical user interface includes means for selecting color component values from a color wheel.

23. The system as in claim 19, wherein said graphical user interface includes means for selecting color component values from a region in an example image.

24. The system as in claim 14, wherein the search request includes providing an image representative of desired open space depictive properties from which open space query parameters are automatically derived.

25. The system as in claim 16, wherein said specifying means includes displaying an extent template on which the user graphically identifies open space extent.

26. The system as in claim 14, wherein said presenting means includes displaying the retrieved images in a first predetermined array ordered according to ranking.

27. The system as in claim 26, wherein said presenting means further includes means for accessing the retrieved images which were not displayed in the first predetermined array.

28. A method for the storage of a digital image in an image database, the method comprising the steps of:
  (a) providing a processor;
  (b) automatically generating with the processor open space metadata independent of manually inputting data; and
  (c) storing the open space metadata along with the associated image in the image database.

29. The method as in claim 28, wherein step (c) indexing the storage for efficient processing.

30. The method as in claim 29, wherein the open space metadata includes depictive properties of open space comprising color, texture, shape, orientation and location.

31. The method as in claim 28, wherein step (a) includes providing a general purpose programmable computer as the processor.

32. The method as in claim 31, wherein step (c) includes remotely locating a storing means that stores the open space metadata with respect to the general purpose computer.

33. The method as in claim 31, wherein step (b) includes providing the open space metadata as either all or any of a plurality of depictive properties comprising open space extent, open space openness, open space average color and open space color range.

34. The method as in claim 33 further comprising determining coordinates of a bounding shape that encompasses the identified open space as the open space extent.

35. The method as in claim 33 further comprising determining a percentage occupied by the open space of a bounding shape that encompasses the open space as the open space openness.

36. The method as in claim 33 further comprising determining the open space average color as individually or any combination of average color components of the open space of pixels in the open space, variance of the color components of the open space of pixels in the open space, and skewness of the color components of the open space of pixels in the open space.

37. The method as in claim 33 further comprising determining the open space color range as a range of color components of the open space.

38. The method as in claim 31, wherein step (b) includes generating an open space map.

39. The method as in claim 33, wherein step (b) includes verifying the open space metadata by the user.

40. A method for retrieval of images from an image database based upon the characteristics of open space in the images contained in the image database, the method comprising the steps of:
  (a) providing a processor;
  (b) transmitting a user specified open space search request to the processor;
  (c) retrieving with the processor images from the image database which match the open space search request;
  (d) automatically ranking with said processor the retrieved open space images from the image database so that images are ranked in descending order of match to the search request; and
  (e) presenting the ranked image results of the image database query to the user.

41. The method as in claim 40, wherein step (c) includes retrieving the images using an indexed search for efficient processing.

42. The method as in claim 40 wherein step (b) includes searching on either or all of a plurality of depictive parameters comprising open space extent, open space openness, open space average color and open space color range.

43. The method as in claim 42 further comprising weighting depictive properties of open space in the search request.

44. The method as in claim 40 further comprising providing an image representative of desired open space depicts properties from which open space query parameters are automatically derived as the search request.

45. The method as in claim 40 further comprising displaying an extent template on which the user graphically identifies open space extent.

46. The method as in claim 40 further comprising displaying the retrieved images in a first predetermined array ordered according to rank.

47. The method as in claim 46 further comprising accessing the retrieved images which were not displayed in the first predetermined array.

48. The method as in claim 40 further comprising providing a graphical user interface for inputting and altering search parameters.

49. The method as in claim 48 further comprising providing a scroll bar for inputting and altering search parameters.

50. The method as in claim 48 further comprising providing a semantic name for inputting and altering search parameters.

51. The method as in claim 48 further comprising providing a color wheel for inputting and altering search parameters.

52. The method as in claim 48 further comprising extracting color component values from an example image for inputting and altering search parameters.

53. A computer program product for retrieval of images from an image database based upon the characteristics of open space in the images contained in the image database, comprising: a computer readable storage medium having a computer program stored thereon for performing the steps of:
  (a) transmitting a user specified open space search request; and
  (b) retrieving with the processor images from the image database which match the open space search request;
  (c) automatically ranking with said processor the retrieved open space images from the image database so that images are ranked in descending order of match to the search request; and (d) presenting the ranked image results of the image database query to the user.

54. The computer program product as in claim 53 wherein step (b) includes searching on either or all of a plurality of depictive parameters comprising open space extent, open space openness, open space average color and open space color range.

55. The computer program product as in claim 53 further comprising weighting depictive properties of open space in the search request.

56. The computer program product as in claim 53 further comprising providing an image representative of desired open space depicts properties from which open space query parameters are automatically derived as the search request.

57. The computer program product as in claim 53 further comprising displaying an extent template on which the user graphically identifies open space extent.

58. The computer program product as in claim 53 further comprising displaying the retrieved images in a first predetermined array ordered according to rank.

59. The computer program product as in claim 58 further comprising accessing the retrieved images which were not displayed in the first predetermined array.

60. The computer program product as in claim 53 further comprising providing a graphical user interface for inputting and altering search parameters.

61. The computer program product as in claim 60 further comprising providing a scroll bar for inputting and altering search parameters.

62. The computer program product as in claim 60 further comprising providing a semantic name for inputting and altering search parameters.

63. The computer program product as in claim 60 further comprising providing a color wheel for inputting and altering search parameters.

64. The computer program product as in claim 60 further comprising extracting color component values from an example image for inputting and altering search parameters.

65. A computer program product for storage of a digital image in an image database, comprising: a computer readable storage medium having a computer program stored thereon for performing the step of:
   (a) automatically generating open space metadata independent of manually inputting data; and
   (b) storing the open space metadata along with the associated image in the image database.

66. The computer program product as in claim 65, wherein step (a) includes providing the open space metadata as either all or any of a plurality of depictive properties comprising open space extent, open space openness, open space average color and open space color range.

67. The computer program product as in claim 66 further comprising determining coordinates of a bounding shape that encompasses the identified open space as the open space extent.

68. The computer program product as in claim 66 further comprising determining a percentage occupied by the open space of a bounding shape that encompasses the open space as the open space openness.

69. The computer program product as in claim 66 further comprising determining the open space average color as individually or any combination of average color components of the open space of pixels in the open space, variance of the color components of the open space of pixels in the open space, and skewness of the color components of the open space of pixels in the open space.

70. The computer program product as in claim 66 further comprising determining the open space color range as a range of color components of the open space.

71. The computer program product as in claim 65, wherein step (a) includes generating an open space map.

72. The computer program product as in claim 65, wherein step (a) includes verifying the open space metadata by the user.

73. The computer program product as in claim 65, wherein the open space metadata includes depictive properties of open space comprising color, texture, shape, orientation and location.

* * * * *